United States Patent
Eng (10) Patent No.: US 9,754,047 B2
(45) Date of Patent: Sep. 5, 2017

(54) DYNAMICALLY ADAPTING OBJECTS

(71) Applicant: ORACLE INTERNATIONAL CORPORATION, Redwood Shorse, CA (US)

(72) Inventor: Ben Eng, Frisco, TX (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 513 days.

(21) Appl. No.: 14/100,154

(22) Filed: Dec. 9, 2013

(65) Prior Publication Data
US 2015/0161188 A1    Jun. 11, 2015

(51) Int. Cl.
*G06F 17/30* (2006.01)
*G06F 9/54* (2006.01)

(52) U.S. Cl.
CPC ........ *G06F 17/30914* (2013.01); *G06F 9/541* (2013.01)

(58) Field of Classification Search
CPC ........... G06F 17/30144; G06F 17/2247; G06F 17/30179; G06F 17/30914
See application file for complete search history.

(56) References Cited

U.S. PATENT DOCUMENTS 5,421,012 A * 5/1995 Khoyi ................. G06F 8/76
715/700
2005/0193368 A1 * 9/2005 Becker ................. G06F 9/4443
717/106
2013/0031137 A1 * 1/2013 Chen ................. G06F 17/30592
707/797
2013/0117319 A1 * 5/2013 Soltani ............... G06F 17/30569
707/792

OTHER PUBLICATIONS

Wang, Guanhua. "Improving data transmission in web applications via the translation between XML and JSON." Communications and Mobile Computing (CMC), 2011 Third International Conference on. IEEE, 2011.*
Wuyts, Roel. "Declarative reasoning about the structure of object-oriented systems." Technology of Object-Oriented Languages, 1998. TOOLS 26. Proceedings. IEEE, 1998.*

* cited by examiner

*Primary Examiner* — Nan Hutton
(74) *Attorney, Agent, or Firm* — Cooper Legal Group, LLC (57) ABSTRACT

Systems, methods, and other embodiments associated with dynamically generating adaptations of data objects are described. In one embodiment, a method includes receiving a request to access a requested portion of a data object. The data object is part of an application and the data object is in a first format that is native to the application and the request is for the data object in a second format. The example method includes analyzing, using at least hardware of a computer, the data object to identify the requested portion within the data object. The example method includes dynamically generating, in a volatile memory of the computer, an adaptation of the portion of the data object to provide access to the portion of the data object in the second format.

20 Claims, 10 Drawing Sheets

DYNAMICALLY ADAPTING OBJECTS

BACKGROUND

Different applications are generally configured on a per application basis and thus use/store data objects that are formatted in a native (i.e., particular to the application) format. That is, data objects associated with an application are formatted in a way that is specific to the application and not in a generic format that may be interpretable by other applications. However, when the data objects are in a native format of an application, accessing the data objects to perform additional functions using other applications/tools can be difficult. This is because the native format of the data objects is ill-suited for use by the other applications/tools. Accordingly, functionality may be built into the application to provide access to the data objects. However, configuring the application with built in functionality can be a complex and processing intensive task.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments are described herein that are associated with dynamically generating adaptations for data objects to provide access to the data objects in different formats. Consider that when an application is created future uses or needs to access data within the application may be unknown. Accordingly, the application is likely to be created without including compatibility for different data formats and without an ability to easily introduce this compatibility into the application.

For example, consider an application that is programmed using the Java programming language and thus includes Java objects. However, the application is not built to expose its java objects in Extensible Markup Language (XML) format. To do so, the application would have to be built with a Java binding or serialization technologies such as Java Architecture for XML Binding (JAXB). This omission may be because implementing Java to XML serialization within the application is a complex task. Moreover, including serialization functionality with the application may even be impractical, such as for large databases.

Accordingly, without the serialization/binding functions built into the application, it may not be possible to access the Java objects of the application in an XML or Document Object Model (DOM) format. Thus, in one embodiment, data objects (e.g., Java objects) of the application are dynamically adapted without using built in binding/serialization functionality and without modifying the application or intruding into operation of the application. That is, the data objects of the application are accessed and adapted in-memory without modifications by the application itself. In this way, the Java objects, which otherwise would be inaccessible in a common format, can be adapted on-the-fly to provide access in a common format (e.g., XML).

Figure 1:
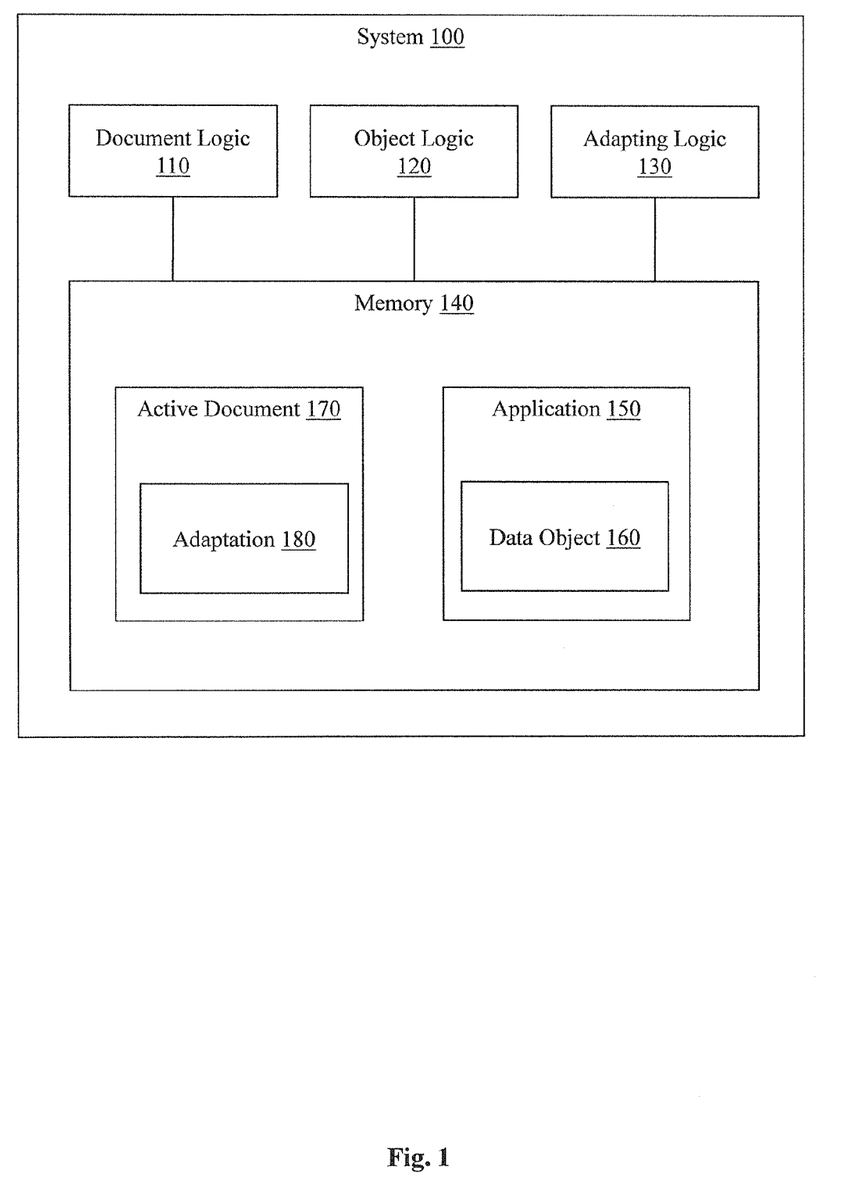
FIG. 1 illustrates one embodiment of a system associated with dynamically generating adaptations of data objects to provide access to the data objects in different formats.

For example, with reference to FIG. 1, one embodiment of a system 100 associated with dynamically generating adaptations of data objects is illustrated. The system 100 includes document logic 110, object logic 120, and adapting logic 130. The system 100 also includes a memory 140 that is configured to store an application 150, which is comprised of, for example, data object 160. The memory 140 is, for example, a working memory of the system 100. That is, in one embodiment, the memory 140 is a random access memory (RAM), flash memory, cache memory, or other low-latency memory that stores data for processing by the system 100. In another embodiment, the memory 140 may be a hard disk drive or other storage medium; however, for purposes of this discussion the memory 140 will be discussed as a RAM or other low-latency memory. Additionally, while illustrated as a single continuous memory device, the memory 140 may include multiple separate physical memory devices.

Accordingly, consider that the application 150 is, for example, a Java application or application of another format that does not include serialization or binding functionality for providing access to the data object 160 in a common format (e.g., XML). Thus, the data object 160 is generally not accessible in a common format because there is no built in ability within the application 150 to output the data object 160 in a different format than the native format (e.g., Java) in which the data object 160 is already programmed and stored. For example, consider that the data object 160 is comprised of various variables, functions, and/or data structures that are part of the application 150. In general, the data object 160 includes components such as the variables, functions and data structures which are related through links and other various associations such as classes. In one embodiment, the data object 160 is composed of objects in a Java programming format that is native to the application 150.

Accordingly, the data object 160 is not in a common format, such as XML or a World Wide Web Consortium (W3C) Document Object Model (DOM) format. Consequently, the data object 160 is generally not cross-platform compatible because the data object 160 is formatted in a native format (e.g., Java) that is specific to the application 150 and is not interpretable by other applications/tools.

However, in one embodiment, the document logic 110 is configured to initialize an active document 170 in the memory 140 as an entry point for accessing the data object 160 in a common format, which otherwise would not be possible. The active document 170 is, for example, dynamically created in the memory 140 by the document logic 110 to include an adaptation 180 of the data object 160. In one embodiment, the document logic 110 generates the active document 170 in order to expose application programming interfaces (APIs) so that other programs/applications/tools (e.g., XPath, XQuery, XSLT, and so on) and users can access the data object 160 in a second format (e.g., XML) using the active document 170 and the adaptation 180. The adaptation 180 is, for example, a light wrapper that provides access to the data object 160 in a format different from a native format of the data object 160.

Accordingly, the adaptation 180 reflects components within data object 160 in a different format. That is, the adaptation 180 is a structure (e.g., data structure/object) that reflects the data object 160 by including elements that correlate/link with different components within the data object 160, but are in a different format than the actual components of the data object 160. In this way, the adaptation 180 and the active document 170 provide access to the data object 160 in a format different from the native format of the data object 160 and without using binding/serialization built into the application 150.

For example, consider that the document logic 110 is configured to receive requests to access the data object 160. The requests are, for example, requests from different processes and/or users that need to access different portions of the data object 160. In one embodiment, the processes are, for example, various DOM and/or XML tools such as XPath, XSLT, XQuery, and so on. In either case, the requests are generally for a less-than-whole portion of the data object 160.

Accordingly, the system 100 does not adapt all of the data object 160 at once for a request, but instead adapts the data object 160, for example, on a per request basis. Consider that adapting the data object 160 as a whole would be a computationally and memory intensive task. Thus, the system 100 incrementally and dynamically adapts portions of the data object 160 on-demand as requested. Further consider that the data object 160 may be large and, thus, may consume a large amount of the memory 140. However, the request may be for a comparatively smaller portion of the data object 160. Accordingly, the request specifies a portion of the data object 160 or some attribute/feature of the data object 160 that is to be adapted. Consequently, adapting all of the data object 160 is not necessary since the request is only for the portion and adapting the whole data object 160 at once would result in extra information that would not be useful for the request.

Accordingly, in one embodiment, the object logic 120 is configured to analyze the data object 160 to identify the requested portion. For example, the object logic 120 evaluates links and components within the data object 160 that are related to the requested portion. In this way, the object logic 120 traces links through the data object 160 to navigate the data object 160 and locate relevant portions of the data object 160 that are associated with the request portion.

Using the identified relevant portions that are associated with the requested portion, the adapting logic 130 can dynamically generate the adaptation 180 with elements (e.g., links, functions, structures, and so on) that are related to the requested portion while leaving unrelated elements out of the adaptation 180. In this way, the adapting logic 130 can reduce an amount of time to provide the requested portion and can still provide access to the data object 160.

Figure 2:
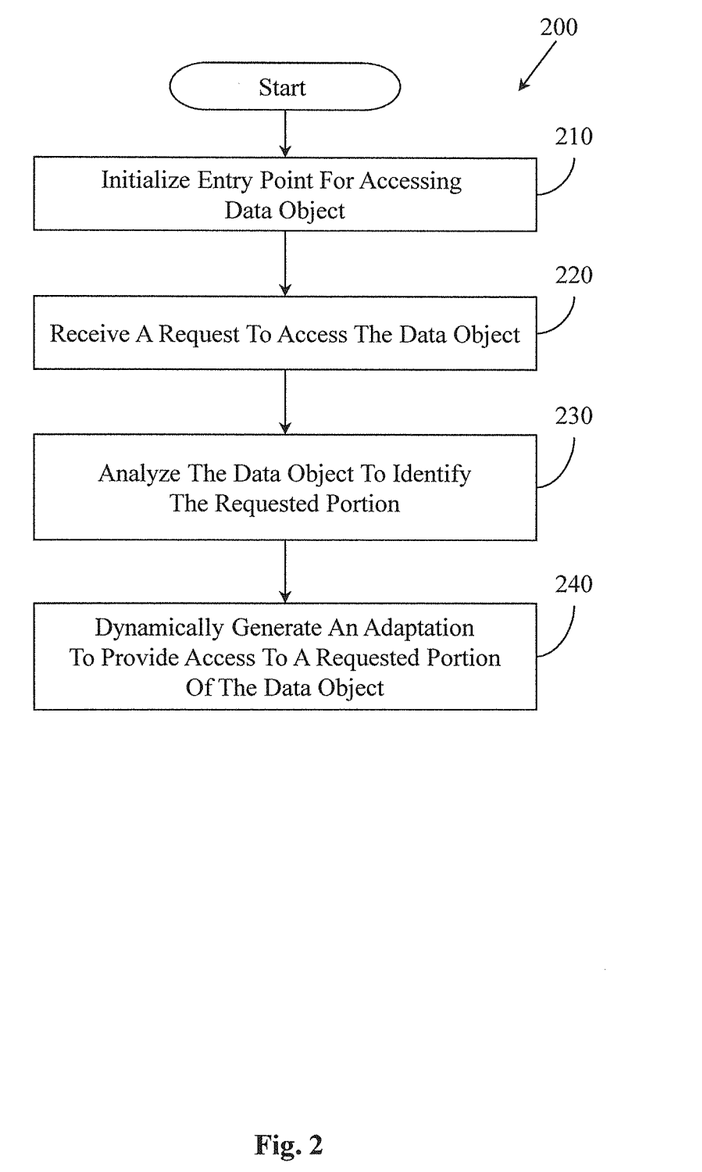
FIG. 2 illustrates one embodiment of a method associated with dynamically generating adaptations of data objects.

Further details of analyzing and dynamically adapting data objects will be discussed in relation to FIG. 2. FIG. 2 illustrates a method 200 associated with dynamically adapting data objects between formats. FIG. 2 will be discussed from the perspective of a computer (e.g., computing system 100) that performs the method 200 and that includes a memory (e.g., memory 140) in which a data object and an adaptation of the data object reside. Additionally, the method 200 will be discussed along with FIGS. 3-9, which illustrate an example of a data object being adapted according to method 200. While method 200 will be discussed from the perspective of the computer and the memory, of course, in other embodiments, the method 200 may operate in different configurations with multiple memories and so on.

At 210, an active document is initialized in memory as an entry point for accessing the data object. In general, the active document and the data object are stored in the memory, which is a working memory (e.g., volatile low-latency memory) of the computer. However, the data object and the active document may also be stored in different memories and/or memories that are non-volatile (e.g., flash memory, hard disk drive, and so on). In either case, the active document includes interfaces for accessing the data object via an adaptation. Accordingly, the active document serves as an interface (e.g., a custom API) for accessing the data object and performing various functions against the data object. In one embodiment, the custom API is a W3C Document Object Model (DOM) that enables the use of XPath, XQuery, and XSLT tools to access the data object in a common format. Additionally, the active document provides an adaptation of the data object (i.e., a Java object) to a W3C element, an adaptation from a JavaBeans Property to a W3C element, and an adaptation from a property value to a W3C text.

Figure 3:
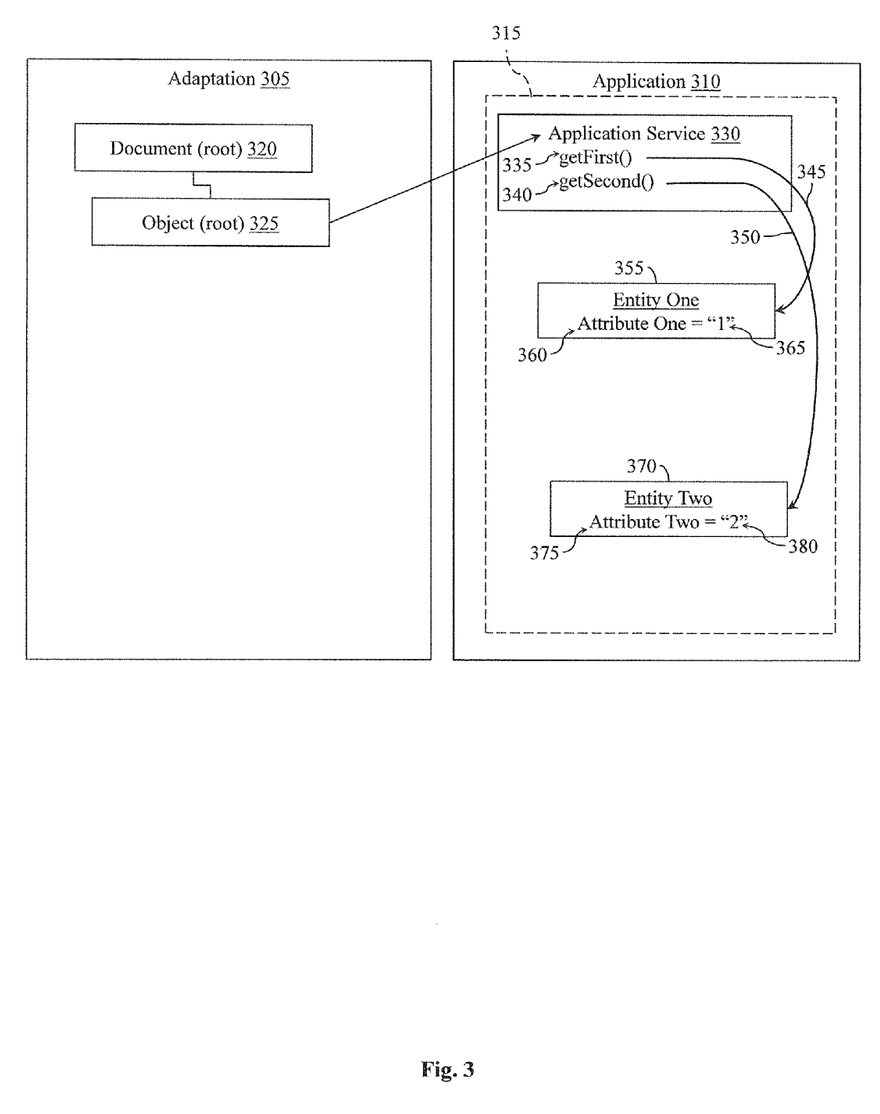
FIG. 3-9 illustrate one example of a data object and adapting the data object.

Of course, as previously explained, the data object is in a first format that is, for example, native to the application and is generally not cross platform compatible. Accordingly, the adaptation is incrementally generated to provide access to portions of the data object in a second format on-demand as the portions are requested. For example, FIG. 3 illustrates an adaptation 305 that has been newly initialized along with an active document (not shown). The adaptation 305 correlates with an application 310 that is composed of a data object 315. Because the adaptation 305 has been newly initialized and has not yet received any requests, the adaptation 305 includes only a document root element 320 and an object root element 325 that correlate with a root application service 330 of the object 315. The root application service 330 is, for example, an entry point or primary element (e.g., class, function, etc.) within the data object 315 under which other elements in the data object 315 are organized. While the document root 320 is illustrated as part of the adaptation 305, in one embodiment, the document root 320 is actually the active document itself with the object root 325 and other elements that hang from the document root 320 being the adaptation 305. However, for purposes of simplicity in this discussion, the document root 320 is illustrated as a root node of the adaptation 305.

The root application service 330, as illustrated includes a component 335 and a component 340. The components 335 and 340 are, for example, functions, or operations that provide links to other components within the data object 315. The component 335 provides a link 345 to a component 355 (e.g., an additional Java object), which is comprised of a variable 360 (i.e., a property) with a value 365. The component 340 provides a link 350 to a component 370, which is comprised of a variable 375 with a value 380. While the application 310 and the data object 315 are illustrated with a certain set of components, of course, in another embodiment, the application 310 and the data object 315 may include a variety of different data objects that each include various different components than those illustrated.

Continuing with method 200, at 220, a request to access a portion of the data object is received. In one embodiment, the request is a request from a computing tool or process that is separate from and unrelated to the application 310. The request may include content that identifies a portion of the data object for retrieval. That is, for example, the request may identify a specific known element (e.g., variable or class) or the request may identify a search term or other criteria for which all related elements are to be dynamically generated in the adaptation.

For example, the following twelve lines of pseudo code represent how an active document is first initialized using commands at lines 2-3 and then a request is generated at line 8 against the active document.

Pseudo Code Example 1

```
(1) ApplicationService Service = . . .
(2) Reflector reflector = new Reflector ( );
(3) Document tree = reflector.buildDocument( service, "root");
(4) XPathFactory xpFactory = XPathFactory.newInstance( );
(5) XPath xpath= xpFactory.newXPath( );
(6) try {
(7) XPathExpression expression = xpath.compile
("/root/first/attributeOne/text( )");
(8) Object result = expression.evaluate (tree, XPathConstants.STRING);
(9) }
(10) catch (XPathExpressionsException e) {
(11) //handle the error
(12) }
```

Referring to FIG. 3, as a result of the pseudo code example, the active document (i.e., the document root 320) and the adaptation 305 are initialized from lines 2-3, as discussed at 210 of method 200. Subsequently, at line 8, a process associated with the pseudo code provides a request to the active document for a first element in the data object 315 named "Attribute One." In this way, various processes can use interfaces provided by the active document that cause the adaptation 305 to be generated for additional portions of the data object 315.

For example, further consider method 200 at 230. At 230, the data object is analyzed to identify the requested portion. That is, the computer analyzes the data object by evaluating links (e.g., links 345 or 350) and components (e.g., components 335, 340, and so on) related to the requested portion within the data object via the active document and the adaptation 305. Evaluating the various components and links the computer can navigate through the data object 315 using the adaptation 305 to determine relevant portions of the data object that are associated with the request. In this way, the data object 315 can be traversed using the adaptation 305 to search for and identify relevant portions of the data object 315 that are related to the request.

Further consider method 200 at 240. At 240, the adaptation is dynamically generated in the memory to provide access to the requested portion of the data object in the second format. While block 240 is illustrated as occurring after block 230, of course, blocks 230 and 240 may occur in parallel or in a different order than shown. In general, the active document and the adaptation 305 permit the computer to access the data object 315 by dynamically generating the adaptation 305 for the request. For example, now consider FIGS. 4-6, which illustrate the application 310 and dynamically generating (i.e., building and/or expanding) the adaptation with elements in a tree structure that correlate with the data object 315 in response to the request from line 8 of the pseudo code example 1.

Figure 4:
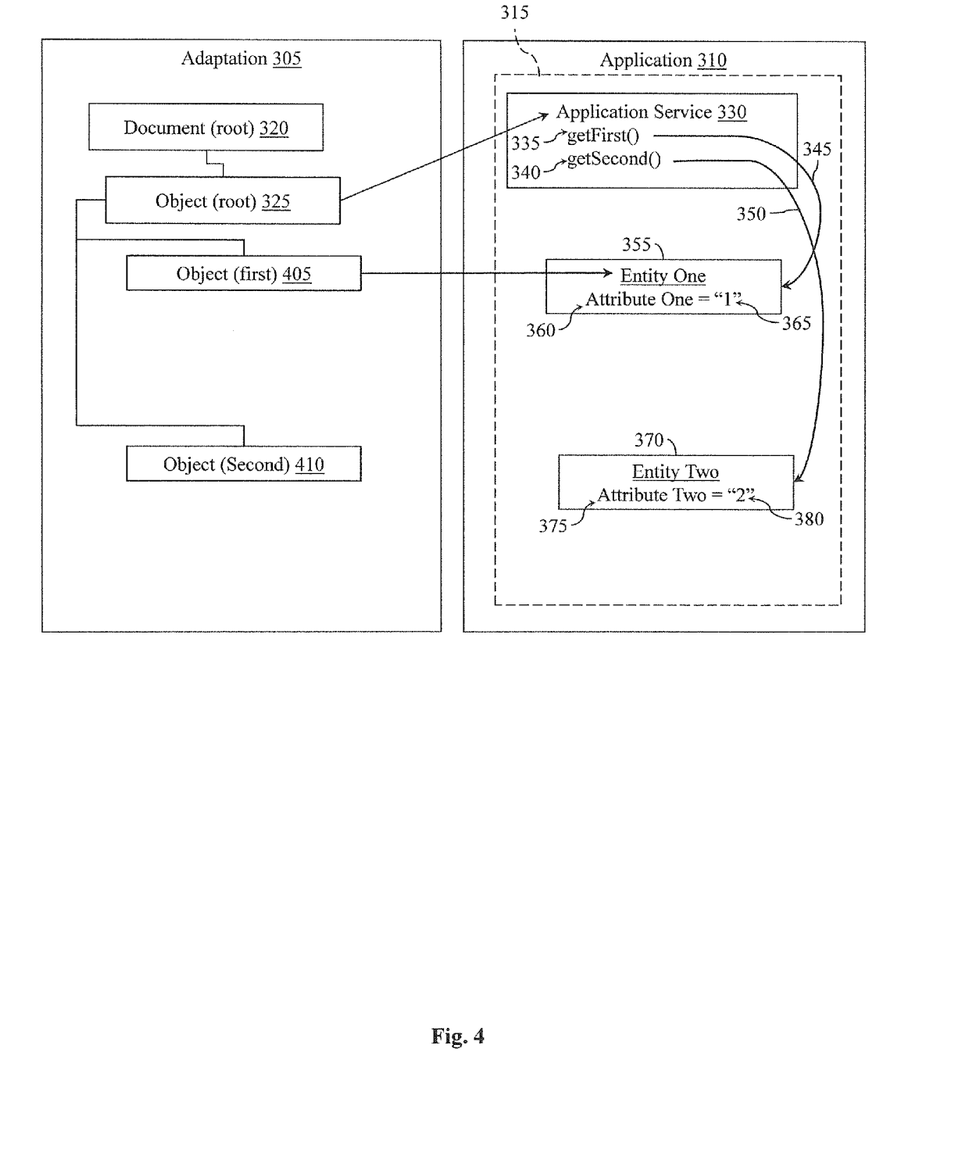

FIG. 4 illustrates how the adaptation 305 is incrementally generated or, as put another way, lazily materialized as the data object 315 is evaluated for the request and relevant portions of the data object 315 are identified. For example, a first link from the object root 325 into the data object 315 reveals the application service component 330 and subcomponents 335 and 340.

Accordingly, the adaptation 305 is dynamically generated to include the element 405 and the element 410 since the components 335 and 340 are associated with or are part of a tree structure that includes subsequent elements relevant to the requested portion. Thus, FIG. 4 illustrates evaluating the request up to "/root/first" during execution of line 8.

Figure 5:
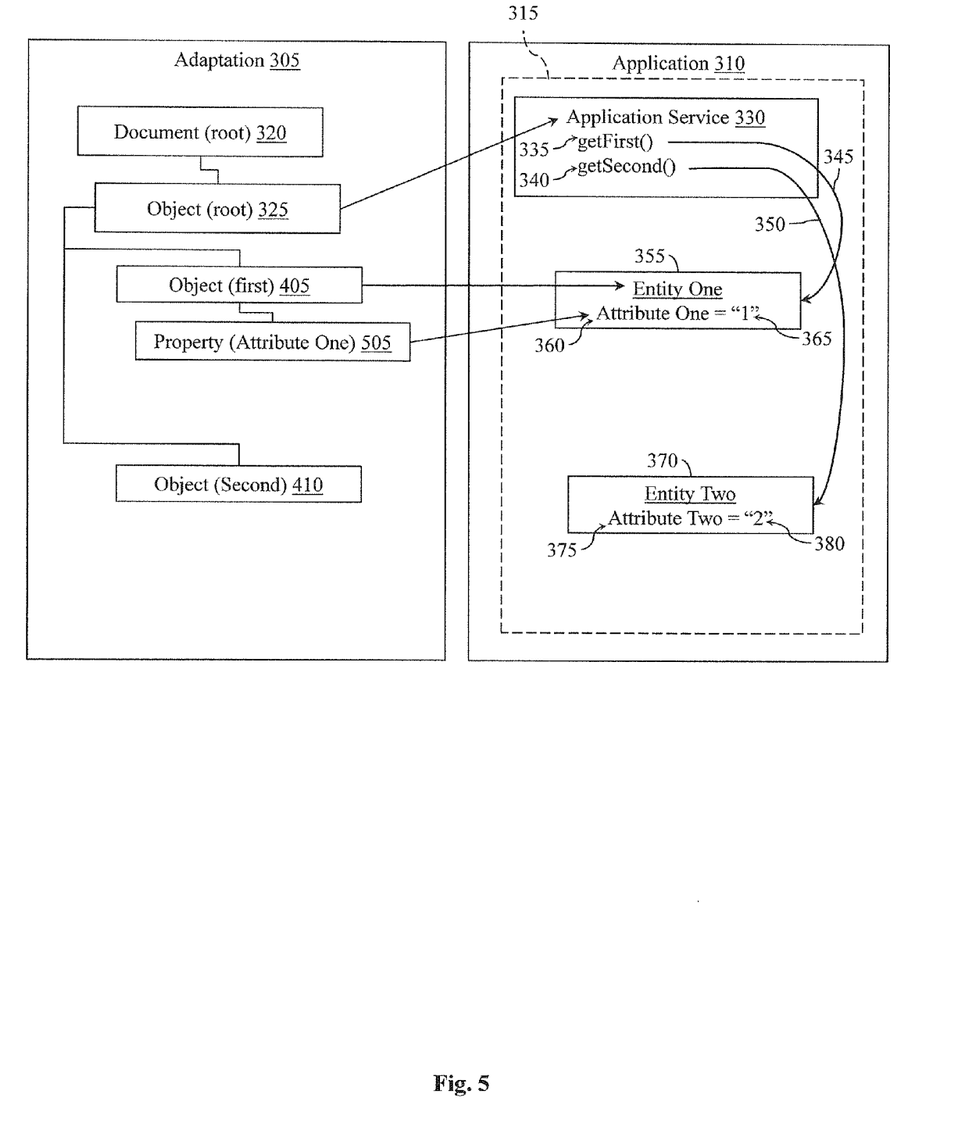

For example, continuing to evaluate the object 315 results in tracing the link 345 and identifying the entity one 355. In general, the data object 315 is analyzed and elements in the adaptation 305 are dynamically generated to permit navigating the data object 315 until the requested portion is identified and also adapted. FIG. 5 depicts evaluation of the request up to "/root/first/attributeOne" during execution of line 8. As shown in FIG. 5, the adaptation 305 is dynamically modified to include an element 505 in the tree structure that correlates with the attribute one variable 360.

Figure 6:
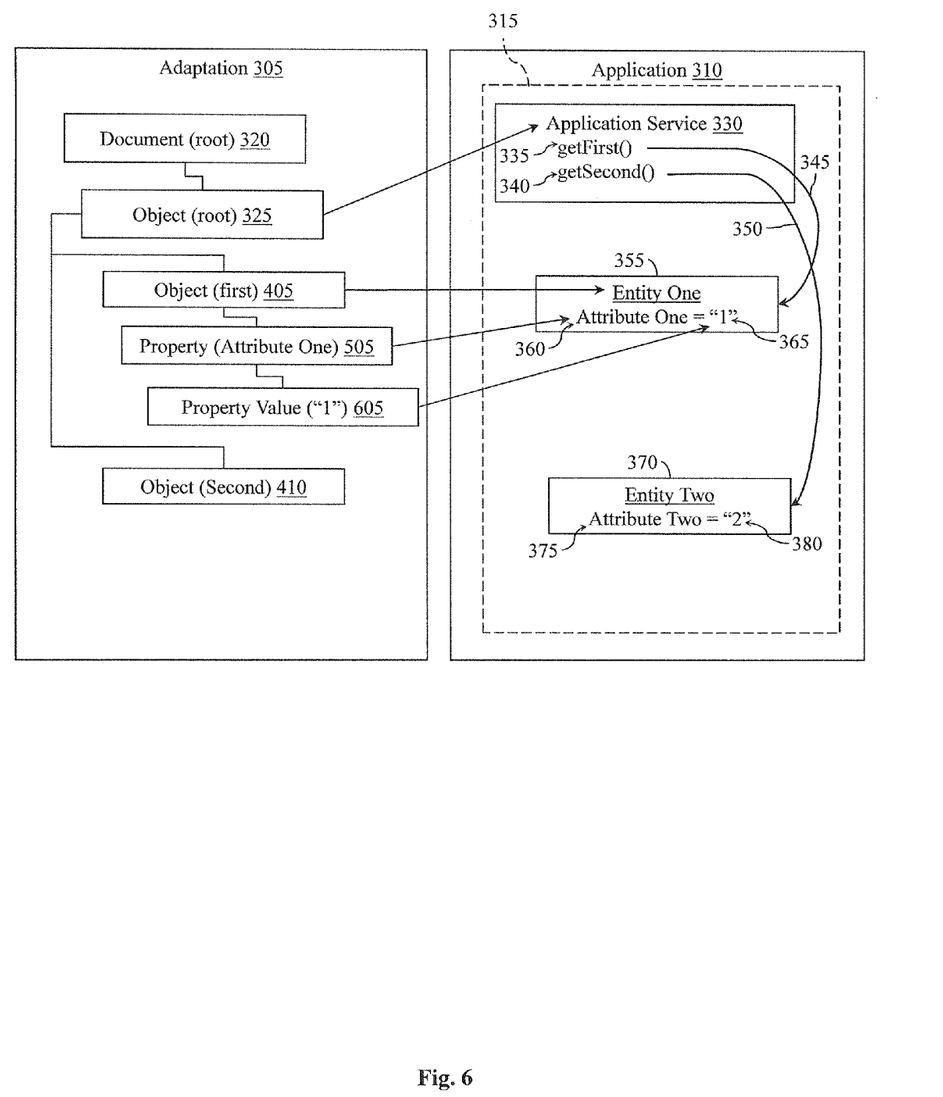

FIG. 6 further illustrates how the adaptation 305 dynamically generates a property value element 605 that correlates with the value 365 of the attribute one variable 360. Accordingly, FIG. 6 depicts the evaluation of the pseudo-code up to "/root/first/attributeOne/text( )" during execution of line 8. In general, for example, the elements in the adaptation 305 are meta data that describe the data object 315. That is, the data object 315 itself is represented or, as put another way, reflected by the meta-data elements in the tree structure of the adaptation 305 in order to provide access to the data object 315 in a different format than a native format of the data object 315.

Accordingly, upon generating the property value 605 the request has been fulfilled since the requested portion has been adapted. Thus, the requested portion is subsequently available via the adaptation 305 in a common format (e.g., a World Wide Web Consortium (w3c) document object model (DOM) format, XML, and so on). Additionally, the adaptation has been generated without modifying the data object 315 or the application 310 and by simply analyzing elements within the structure of the data object 315. Thus, the application 310 may function as normal while the adaptation 305 is being generated.

Furthermore, as shown in FIG. 6, dynamically generating the adaptation 305 results in incrementally generating entries in the tree structure for a part of the data object 315 that is associated with the requested portion and not for portions of the data object 315 that are unrelated (e.g., 370-380) to the request. In this way, the adaptation is generated incrementally for only relevant portions to reduce overhead associated with analyzing the data object 315 and generating the adaptation 305.

Figure 7:
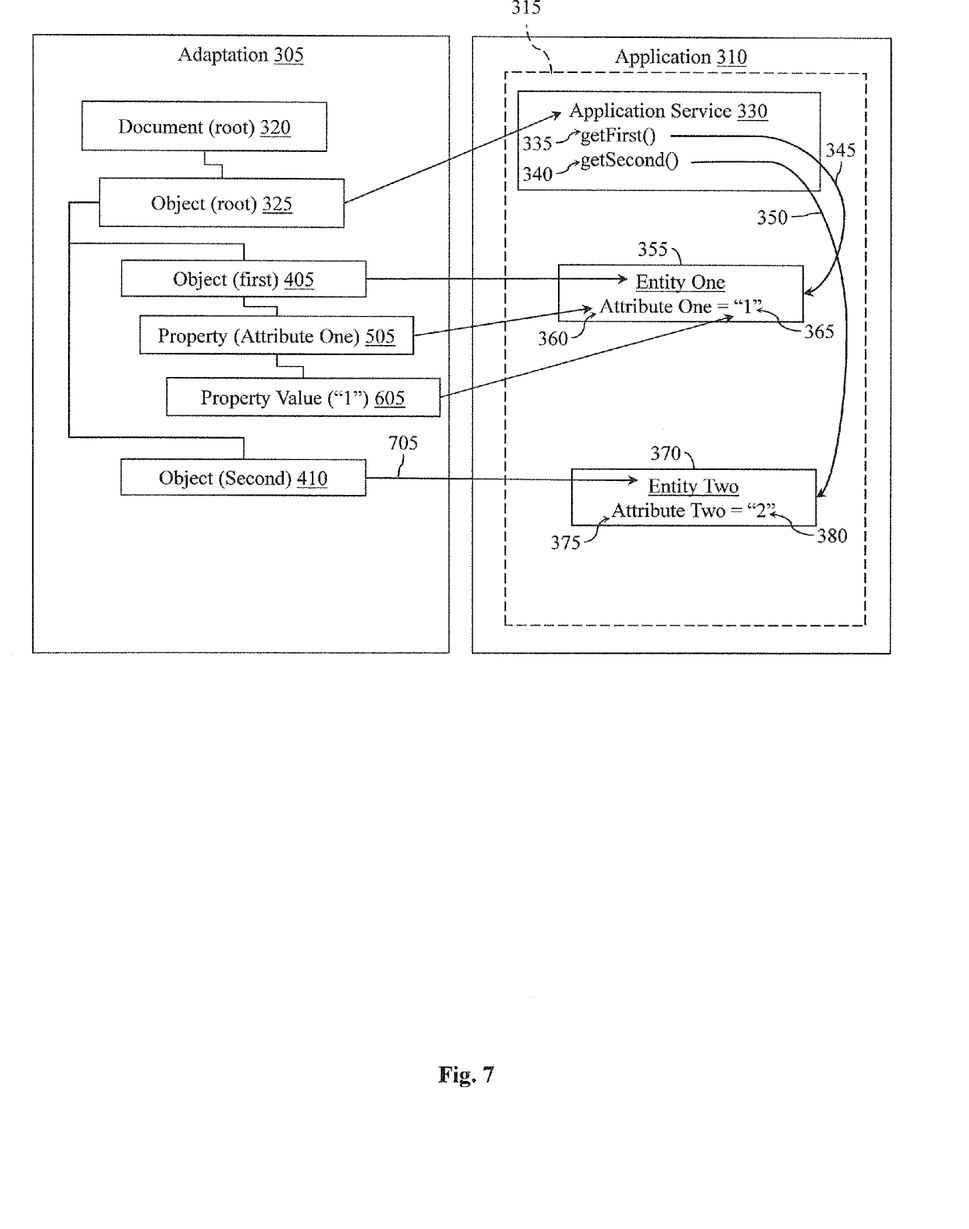
Figure 8:
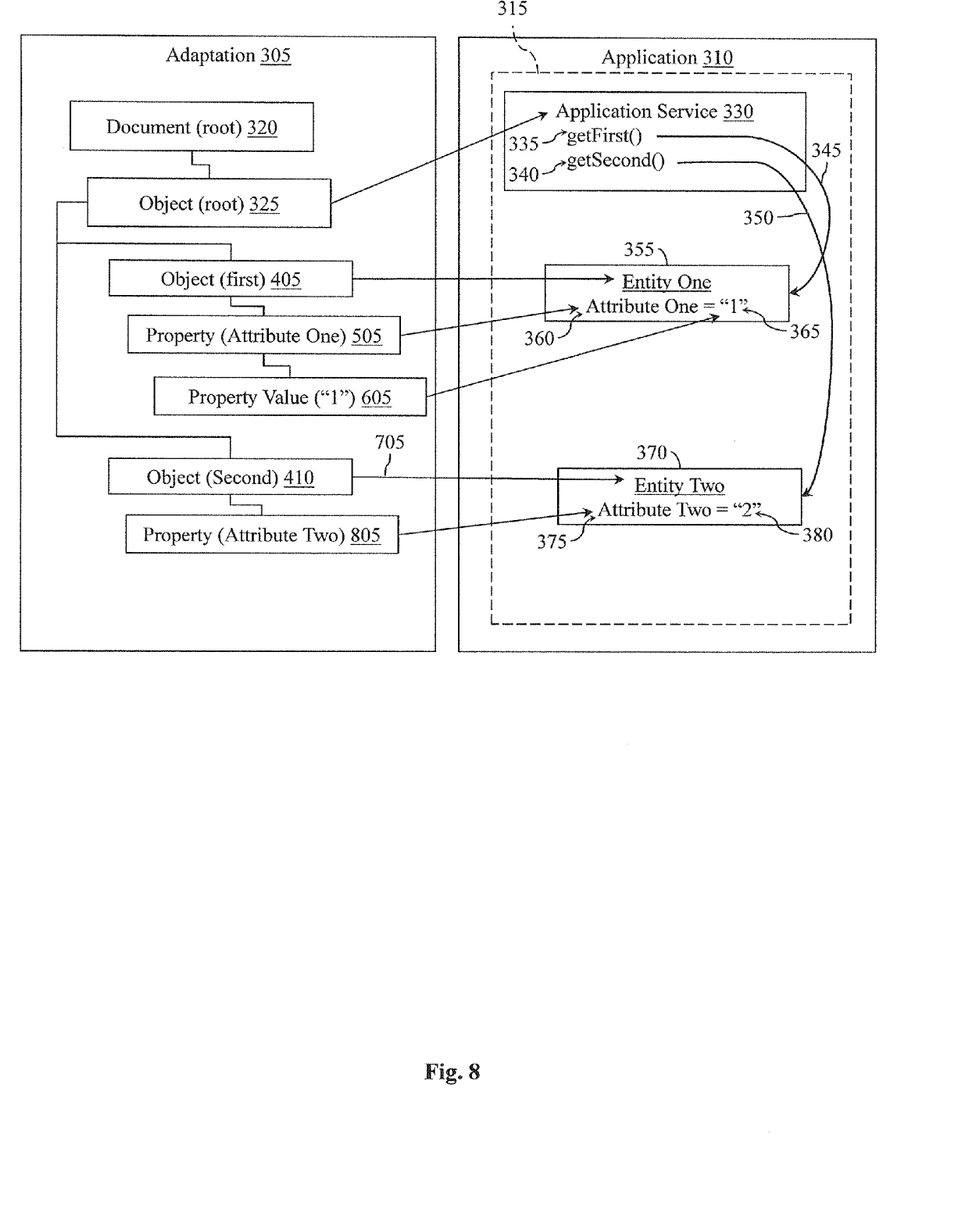
Figure 9:
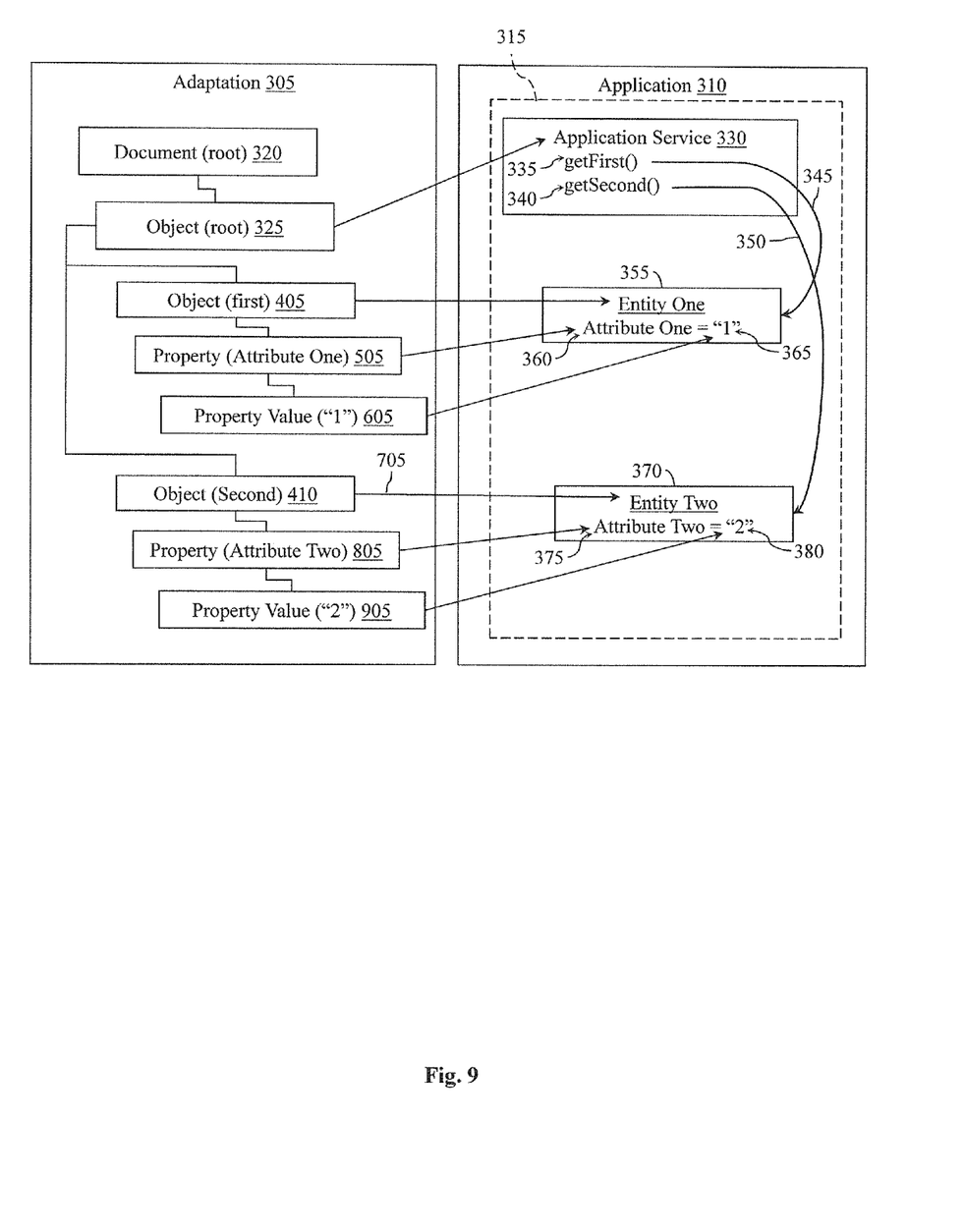

Continuing with the adaptation 305, now consider the following pseudo code example 2 along with FIGS. 7-9.

Pseudo Code Example 2

```
(1) try {
(2) XPathExpression expression = xpath.compile
("/root/second/attributeTwo/text( )" );
(3) Object result = expression.evaluate (tree, XPathConstants.STRING);
(4) }
(5) catch (XPathExpressionsException e) {
(6) //handle the error
(7) }
```

The pseudo code example 2 details a request, as generated by an XPath process, that is provided to the active document to generate additional portions of the adaptation 305 (i.e., expand/grow the adaptation 305). For example, at 220 of method 200 a request for "attribute two" is received as specified by the pseudo code example 2 at line 2. Accordingly, the data object 315 is analyzed, at 230, to identify portions of the data object 315 that are associated with the requested portion (i.e., attribute two). However, unlike the request for attribute one, elements in the adaptation 305 have already been generated from previous requests that are associated with the present request and, thus, are not generated again because they are already available in the adaptation 305.

Accordingly, analyzing the data object 315 to identify the requested portion may be simpler since a part of the data object 315 has already been adapted from previous requests. Therefore, analyzing the data object 315 for the current request may only evaluate and traverse links and components that have not already been evaluated from previous requests.

FIG. 7 generally depicts evaluation of the request up to "root/second" during execution of line 3. As shown in FIG. 7, the element 410 was previously adapted since the component 340 was within a same relevant portion of the data object 315 as noted for a previous request. Accordingly, a link 705 already exists to the component 370. Thus, analyzing the data object 315 for the present request includes analyzing the variable 375 and the value 380 instead of further components that occur above the component 370 in a hierarchy of the data object 315.

FIG. 8 illustrates evaluation of the request up to "/root/second/attributeTwo" during execution of line 3. FIG. 9 illustrates evaluation of the request up to "/root/second/attributeTwo/text( )" during execution of line 3. In general, FIGS. 8 and 9 illustrate how the additional sub-elements 805 and 905 of the element 410 are dynamically generated to correlate with the subcomponents 375 and 380 of the component 370 within the data object 315.

Furthermore, while the elements of the adaptation 305 have been discussed as being generated to correlate with the data object 315, dynamically generating the adaptation 305 may also include binding elements in the adaptation 305 to components (e.g., 330-380) within the data object 315 to reflect values and relationships defined by the data object 315. That is, the adaptation is not just a static structure but provides access to the data object 315 as values within the data object 315 change. Additionally, access to the data object is provided in a second format (e.g., XML) without modifying the data object to provide the access and as-is in the first format. That is, neither the data object nor the application is modified to create or provide for creating the adaptation 305. However, in one embodiment, the adaptation 305 may permit modification of values and other aspects of the data object 315 through an in-memory adaptation approach using the adaptation 305 to modify the data object 315.

In this way, an in-memory representation of the data object 315 is dynamically generated to provide access to the data object 315 in a different format than a native format of the data object 315 and on-demand in response to requests for portions of the data object 315.

Additionally, while generating the adaptation 305 has been discussed from the perspective of generating the adaptation 305 in a common format (e.g., XML), in one embodiment, generating the adaptation may include optimizing the adaptation into one or more application specific formats. In this way, generating the adaptation can be customized in order to provide streamlined access for one or more specific applications to the adaptation 305.

Figure 10:
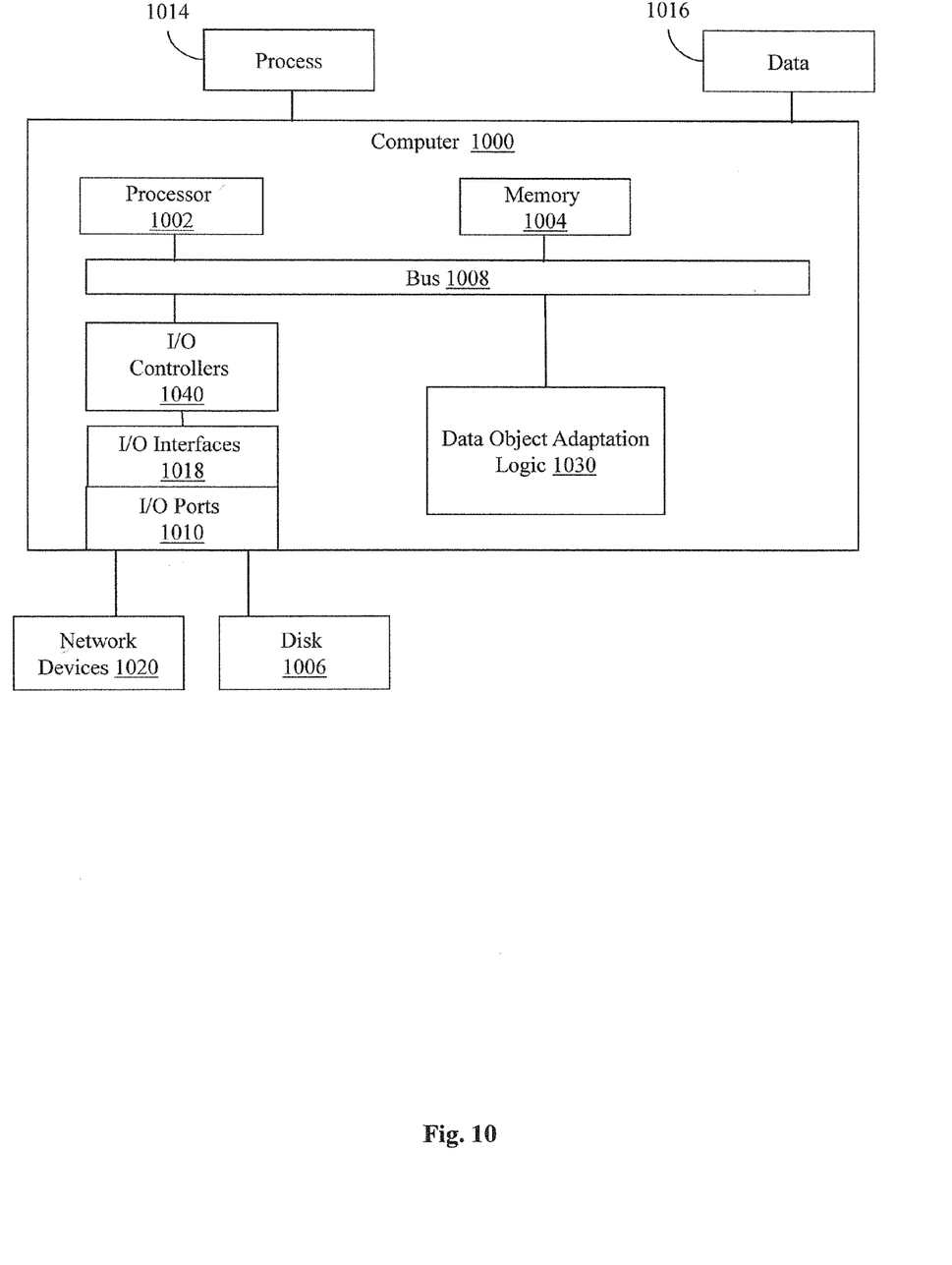
FIG. 10 illustrates an embodiment of a computer associated with dynamically generating adaptations of data objects to provide access to the data objects in different formats.

FIG. 10 illustrates an example computing device that is configured and/or programmed with one or more of the example systems and methods described herein, and/or equivalents. The example computing device may be a computer 1000 that includes a processor 1002, a memory 1004, and input/output ports 1010 operably connected by a bus 1008. In one example, the computer 1000 may include data object adaptation logic 1030 configured to facilitate dynamically generating an adaptation of a data object similar to system 100 shown in FIG. 1. In different examples, the logic 1030 may be implemented in hardware, a non-transitory computer-readable medium with stored instructions, firmware, and/or combinations thereof. While the logic 1030 is illustrated as a hardware component attached to the bus 1008, it is to be appreciated that in one example, the logic 1030 could be implemented in the processor 1002.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A storage disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described.

Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C. §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

RAM: random access memory.

XML: extensible markup language.

"Computer-readable medium", as used herein, is a non-transitory medium that stores instructions and/or data. A computer-readable medium may take forms, including, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C. §101.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C. §101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a computer cause the computer to perform at least:
   receiving a request to access a requested portion of a data object, wherein the data object is part of an application, and wherein the data object is in a first format that is native to the application and the request is for the data object in a second format;
   analyzing, using at least hardware of the computer, the data object to identify the requested portion within the data object by tracing components and links through the data object to locate components and corresponding data values associated with the requested portion; and
   generating, in a volatile memory of the computer, an adaptation in a data structure representing the requested portion of the data object to provide access to the requested portion of the data object in the second format, wherein generating the adaptation includes generating a tree structure of elements in the second format that represent the components and corresponding data values of the data object that are identified based at least in part on the tracing;
   wherein the adaptation provides an interface to the requested portion of the data object in the second format without copying the requested portion of the data object.

2. The non-transitory computer-readable medium of claim 1, wherein generating the adaptation provides access to the requested portion without modifying the data object or the application, wherein generating the adaptation includes generating the tree structure of elements in the active document to correlate with the requested portion, and
   wherein the adaptation is a light wrapper of the data object that provides an interface to the data object in the second format.

3. The non-transitory computer-readable medium of claim 1, wherein generating the adaptation includes incrementally generating the elements in the tree structure that represents relevant portions of the data object that are associated with the requested portion, wherein generating the adaptation generates the elements in the tree structure for a part of the data object that is associated with the requested portion, and wherein analyzing the data object includes analyzing the requested portion without generating the elements in the adaptation for all of the data object.

4. The non-transitory computer-readable medium of claim 1, wherein analyzing the data object includes evaluating the links and the components related to the requested portion within the data object and navigating the components using the links to determine relevant portions of the data object that are associated with the requested portion.

5. The non-transitory computer-readable medium of claim 1, further comprising instructions that when executed cause the computer to perform at least:
   initializing, in the memory, the adaptation as an active document as an entry point for accessing the data object, wherein the active document and the data object are stored in the memory.

6. The non-transitory computer-readable medium of claim 1, wherein generating the adaptation includes incrementally generating the adaptation on-demand in response to requests for portions of the data object.

7. The non-transitory computer-readable medium of claim 1, wherein generating the adaptation includes binding the adaptation to the requested portion of the data object to reflect values and relationships defined by the data object in the second format, and wherein the data object of the application is not modified and is used as-is in the first format.

8. The non-transitory computer-readable medium of claim 1, wherein generating the adaptation includes generating the adaptation in a World Wide Web Consortium (W3C) document object model (DOM) format from the data object that is in a Java format.

9. A computing system, comprising:
   a processor; and
   memory connected with the processor via at least one communication path, wherein the memory includes stored thereon:
      document logic including instructions that when executed by the processor cause the processor to receive a request to access a requested portion of a data object, wherein the data object is part of an application, and wherein the data object is in a first format that is native to the application and the request is for the data object in a second format;
      object logic including instructions that when executed by the processor cause the processor to, in response to receiving the request, analyze the data object to identify the requested portion within the data object by tracing components and links through the data object to locate components and corresponding data values associated with the requested portion; and
      adapting logic including instructions that when executed by the processor cause the processor to generate, in a working memory, an adaptation as a data structure representing the requested portion of the data object to provide access to the requested portion of the data object in the second format, wherein the adaptation is generated including a tree structure of elements in the second format that represent the components and the corresponding data values of the data object that are identified based at least in part on the tracing, wherein the tree structure of elements are generated in response to completion of the tracing;
      wherein the adapting logic generates the adaptation without copying the requested portion of the data object.

10. The computing system of claim 9, wherein the adapting logic is configured to generate the adaptation to provide access to the requested portion without modifying the data object or the application, and wherein the adapting logic is configured to generate the adaptation by generating the tree structure of elements in an active document to correlate with the requested portion.

11. The computing system of claim 9, wherein the adapting logic is configured to generate the adaptation by incrementally generating the elements in the tree structure that represents relevant portions of the data object that are associated with the requested portion.

12. The computing system of claim 9, wherein the object logic is configured to analyze the data object by evaluating links and components related to the requested portion within the data object and then navigating the components using the links to determine relevant portions of the data object that are associated with the requested portion.

13. The computing system of claim 9, wherein the document logic is configured to initialize, in the working memory, an entry point in the adaptation for accessing the data object, wherein the adaptation and the data object are stored in the memory.

14. The computing system of claim 9, wherein the adapting logic is configured to generate the adaptation by incrementally generating the adaptation on-demand in response to requests for portions of the data object.

15. The computing system of claim 9, wherein the adapting logic is configured to generate the adaptation by binding the adaptation to the requested portion of the data object to reflect values and relationships defined by the data object in the second format, and wherein the data object of the application is not modified and is used as-is in the first format.

16. The computing system of claim 9, wherein the adapting logic is configured to generate the adaptation by generating the adaptation in a World Wide Web Consortium (W3C) document object model (DOM) format from the data object that is in a Java format.

17. The computing system of claim 9, wherein the adapting logic is configured to generate the adaptation by generating the elements in the tree structure for a part of the data object that is associated with the requested portion, and wherein the object logic is configured to analyze the data object by analyzing a part of the data object without analyzing all of the data object.

18. A computer-implemented method, comprising:
   initializing, in a memory, an entry point for accessing a data object, wherein the entry point is an active document that includes interfaces for accessing a tree structure of the data object, and wherein the data object is in a first format and the tree structure provides access to the data object in a second format;
   analyzing the data object to identify a requested portion within the data object in response to a request for the requested portion of the data object by tracing components and links through the data object to locate components and corresponding data values associated with the requested portion; and
   generating, in the memory, elements in the tree structure for the requested portion of the data object to provide access to the requested portion of the data object in the second format that represents the components and the corresponding data values of the data object that are identified based at least in part on the tracing.

19. The computer-implemented method of claim 18, wherein the data object is part of an application, wherein the data object is in the first format that is native to the application and the request is for the data object in the second format, and wherein generating the elements in the tree structure includes optimizing the tree structure into one or more application specific formats to provide access for one or more applications to the second format of the data object.

20. The computer-implemented method of claim 18, wherein generating the elements in the tree structure includes incrementally generating additional elements in the tree structure that represent relevant portions of the data object that are associated with the requested portion to expand the tree structure to include the requested portion.

* * * * *

UNITED STATES PATENT AND TRADEMARK OFFICE
CERTIFICATE OF CORRECTION

PATENT NO. : 9,754,047 B2  
APPLICATION NO. : 14/100154  
DATED : September 5, 2017  
INVENTOR(S) : Eng Page 1 of 1

It is certified that error appears in the above-identified patent and that said Letters Patent is hereby corrected as shown below:

On the Title Page

Column 1, under Applicant, Line 2, delete "Shorse," and insert -- Shores, --, therefor.

In the Specification

In Column 6, Lines 4-9, delete "Accordingly, the adaptation 305 is dynamically generated to include the element 405 and the element 410 since the components 335 and 340 are associated with or are part of a tree structure that includes subsequent elements relevant to the requested portion. Thus, FIG. 4 illustrates evaluating the request up to "/root/first" during execution of line 8." and insert the same on Column 6, Line 3, as a continuation of the same paragraph.

In Column 7, Line 22, delete ""hoot/second"" and insert -- "/root/second" --, therefor.

Signed and Sealed this  
Twenty-ninth Day of May, 2018

Andrei Iancu  
*Director of the United States Patent and Trademark Office*